United States Patent Office 3,472,876
Patented Oct. 14, 1969

3,472,876
OLEFIN EPOXIDATION
Harvey S. Klein, Berkeley, Calif., assignor to Shell Oil Company, New York, N.Y., a corporation of Delaware
No Drawing. Filed Aug. 18, 1967, Ser. No. 661,545
Int. Cl. C07d 1/08
U.S. Cl. 260—348.5                    10 Claims

ABSTRACT OF THE DISCLOSURE

Liquid-phase, direct epoxidation of olefins with molecular oxygen in the presence of cobalt diimine chelates as catalysts.

BACKGROUND OF THE INVENTION

It is known that olefins can be oxidized to olefin oxides in the liquid phase with molecular oxygen in the presence of heavy metal catalysts such as salts of cobalt, vanadium, manganese, and copper. However, in these prior art processes a considerable portion of the starting olefin is oxidized to acidic by-products, for example, formic acid. A particularly serious disadvantage of these acidic by-products is the undesirable side reactions they undergo with the olefin oxide product or the metal catalyst. A typical example is the reaction of formic acid with cobalt compounds to give cobalt formate, which is insoluble in most organic liquid-phase reaction media and, therefore, exerts little if any catalytic effect on the liquid-phase epoxidation reaction.

Numerous approaches directed toward overcoming the serious limitations imposed by acidic by-products are described in the prior art. For example, U.S. Patent 2,650,927, issued Sept. 1, 1953, to Gasson et al. teaches the desirability of maintaining the oxidation mixture within a specified critical pH range by adding an alkaline material to the mixture during oxidation. Another approach comprises maintaining acid by-products at relatively low concentrations in the reaction mixture during oxidation by continuously withdrawing portions of the reaction mixture from the oxidation reactor and stripping the acid therefrom as disclosed by U.S. Patent 2,784,202 issued Mar. 5, 1957, to Gardner et al. Still another approach involves passing the mixture resulting from the oxidation zone through a separate zone in which the acids formed during the oxidation reaction are neutralized with base, and recycling the treated reaction mixture to the oxidation reaction zone as disclosed by U.S. Patent 2,741,623 issued Apr. 10, 1956, to Millidge et al.

SUMMARY OF THE INVENTION

It has now been found that cobalt diimine chelates consisting of cobalt and an organic quadridentate chelating molecule with two diimine chelating sites are efficient catalysts for the direct epoxidation of olefins with molecular oxygen. The efficiency of these cobalt diimine chelates is due in large part to their stability in oxidation mixtures comprising lower carboxylic acids, especially formic acid. For example, it has been found that cobalt diimine chelates undergo no apparent decline in oxidation activity due to decomposition to insoluble cobalt formate. In contrast, it has been found that prior art recognized cobalt oxidation catalysts, such as cobalt oxide, carbonate, acetylacetonate and carboxylates, decrease rapidly in oxidation activity at high olefin conversions due to conversion to cobalt formate.

DESCRIPTION OF PREFERRED EMBODIMENTS

The catalyst

The catalyst consists of a cobalt diimine complex in which the cobalt metal is bonded to two imino nitrogen atoms as well as two atoms of oxygen, i.e., a 1:1 metal complex of a cobalt atom and a quadridentate chelating molecule. The bonding between the cobalt atom and the chelating ligand is illustrated by the Formula I:

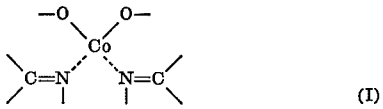
(I)

The bond between Co and O is a normal covalent bond, i.e., the bond is substantially non-ionic in character and the two electrons involved in the bond are provided one each by the Co and O atoms. The bond between Co and the imino nitrogen as represented by the dotted line is a coordinate covalent bond, i.e., bonding interaction between the unshared electron pair of the nitrogen and the vacant electron orbitals of cobalt.

In terms of Formula I the cobalt diimine chelates suitable as catalysts in the process of the invention are ones wherein the imino nitrogen and oxygen moieties are linked by organic moietites into a single quadridentate chelating molecule. One class of useful cobalt chelates are cobalt di-(salicylal)-diimines such as cobalt di-(salicylal)-ethylenediimines and cobalt di-(salicylal)-arylenediimines represented by the Formulas II and III, respectively,

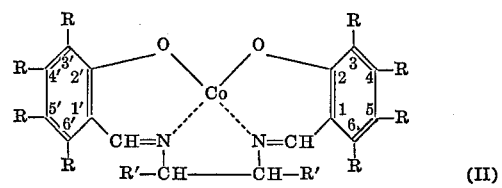
(II)

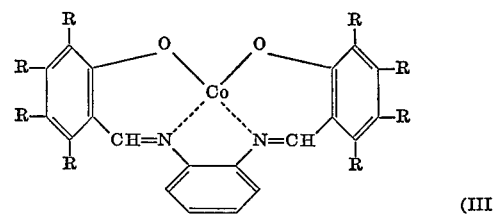
(III)

wherein R' indepedently is hydrogen or alkyl of up to 4 carbon atoms or both together with the two carbons to which they are attached form a vic-arylene radical and R independently is hydrogen, nitro, hydroxy, alkyl of up to 6 carbon atoms and halogen of atomic number 9 to 35 inclusive, i.e., fluorine, chlorine and bromine, with the proviso that R groups are symmetrically substituted in corresponding positions of the aromatic rings, e.g., an R substituent at position 3 is the same as an R substituent at position 3'. Broadly speaking, cobalt di-(salicylal)-diimines are prepared by the reaction of salicylaldehyde, a cobalt salt and an ethylene diamine or a phenylene diamine as disclosed, for example, by Calvin et al., J. Amer. Chem. Soc., 69, 1886 (1947).

Illustrative of suitable cobalt di-(salicylal)-ethylenediimines of Formula II are cobalt di-(salicylal)-ethylenediimine, cobalt di-(3-nitrosalicylal)-ethylenediimine, cobalt di-(5-nitrosalicylal)-ethylenediimine, cobalt di - (4-hydroxysalicylal)-ethylenediimine, cobalt di-(3-ethylsalicylal)-ethylenediimine, cobalt di - (4 - methylsalicylal)-ethylenediimine, cobalt di-(3-phenylsalicylal)-ethylenediimine, cobalt di-(3-fluorosalicylal)-ethylenediimine, cobalt di-(3-chlorosalicylal)-ethylenediimine cobalt di-(4-bromosalicylal)-ethylenediimine, cobalt di-(3,5-dibromosalicylal)-ethylenediimine, cobalt di-(3-chloro-5-propylsalicylal)-ethylenediimine, cobalt di-4-hydroxy-6-methylsalicylal)-ethylenediimine, cobalt di-(3-methyl-6-chlorosalicylal)-ethylenediimine, cobalt di-(salicylal) - methylethylenediimine, cobalt di-(3-nitrosalicylal)-methylethylenediimine, cobalt di-(3,5-difluorosalicylal)-methylethylenediimine, cobalt di-(3-methyl-6-chlorosalicylal)-methylethylenediimine, cobalt di - (4 - hydroxysalicylal)-methylethylenediimine, cobalt di-(salicylal)-1,2-dimethylethylenediimine, cobalt di - (3-nitrosalicylal)-1,2-diethylethylenediimine, and cobalt di-(3-fluorosalicylal)-1,2-diethylethylenediimine. Illustrative of suitable cobalt di-(salicylal)-arylenediimines of Formula III are cobalt di-(salicylal)-phenylenediimine, cobalt di-(3-nitrosalicylal)-phenylenediimine, cobalt di-(5-hydroxysalicylal) - phenylenediimine, cobalt di-(4-methylsalicylal)-phenylenediimine, cobalt di-(4-methylsalicylal)-phenylenediimine, cobalt di-(3,5-dichlorosalicylal)-phenylenediimine, cobalt di-(3-methyl-6-chlorosalicylal)-phenylenediimine, and cobalt di-salicylal)-1,2-naphthalenediimine. Particularly preferred cobalt di-(salicylal)-diimines are cobalt di-(salicylal)-ethylenediimines, especially cobalt di - (salicylal) - ethylenediimine and the corresponding halogenated cobalt di-(salicylal)-ethylenediimines such as cobalt di-(3-fluorosalicylal)-ethylenediimine.

The cobalt diimine chelate is preferably present in catalytic amounts relative to the olefinic reactant. Amounts of cobalt diimine chelate from about 0.0001 to about 0.005 mole per mole of olefin are satisfactory.

The olefin reactant

The process of the invention is generally applicable to any hydrocarbon aliphatic monoolefin having one olefinic linkage, i.e., a non-aromatic carbon-carbon double bond, and having from 3 to 20 carbon atoms, preferably from 3 to 12 carbon atoms, but preferably free from acetylenic unsaturation. The invention, however, is used to particular advantage with acyclic aliphatic terminal monoolefins wherein the carbon atoms of the carbon-carbon double bond have three hydrogen substituents, particularly normal acyclic α-olefins such as propylene, 1-butene, 1-pentene, 1-hexene, 1-heptene, 1-octene, 1-dodecene and 1-hexadecene. Particularly preferred as the α-olefin is propylene.

The reaction conditions

The process of the invention is preferably conducted in the liquid phase in solvents or diluents which are substantially oxidatively inert, thermally stable and liquid at the reaction temperature and pressures. Suitably employed solvents include fully esterified polyacyl esters of polyhydroxyalkanes such as glycerol triacetate, tetraacyl esters of erythritol, diethylene glycol diacetate; halomonoaromatics such as chlorobenzene, bromobenzene and dichlorobenzene; and saturated aliphatic, alicyclic or aromatic nitriles having from 2 to 18 carbon atoms, but preferably 2 to 8 carbon atoms. Suitable aliphatic nitriles include both straight-chain nitriles such as acetonitrile, propionitrile, valeronitrile and adiponitrile and caprylonitrile and branched-chain nitriles such as isobutyronitrile, isovaleronitrile and 3-methylheptanonitrile. Suitable alicyclic and aromatic nitriles are those having up to 6 carbon atoms in the ring and include cycloalkane nitriles such as cyanocyclopentane and 1,2-dicyanocyclohexane and monoaromatic nitriles such as benzonitrile and phthalonitrile. Saturated aliphatic mononitriles, especially of straight-chain character such as acetonitrile and butyronitrile, are particulerly preferred as solvents.

The oxidation is suitably conducted by any of a variety of procedures. In one modification, the olefin reactant, the catalyst and diluent are charged to an autoclave or similar pressure reactor and maintained at reaction conditions while the oxygen is added in increments or continuously. In another modification, reaction is effected in a continuous operation as by contacting the olefin reactant, catalyst and diluent during passage through a tubular reactor. In any modification, the reaction is most efficiently conducted at an elevated temperature and pressure. The reaction temperature suitably varies from about 50° C. to about 250° C., depending in part upon the particular olefin reactant and the catalyst employed. The temperature range from about 75° to about 200° C. is preferred. Suitable reactor pressures are those which serve to maintain a substantial part of the olefin reactant and diluent in the liquid phase. Reactor pressures varying from 15 p.s.i.g. to about 2,000 p.s.i.g. are generally satisfactory although pressures from about 25 p.s.i.g. to about 1,000 p.s.i.g. are preferred. In general, molecular oxygen partial pressures vary from about 2 p.s.i.g. to about 300 p.s.i.g. with partial pressures of about 25 p.s.i.g. to about 200 p.s.i.g. being preferred. The oxygen partial pressure normally is adjusted to from about 1% to about 20% of the volume concentration of total gaseous mixture or from about 80% to about 99% on the same basis to avoid explosive mixtures within the reactor.

The molecular form in which the molecular oxygen is introduced is not critical and oxygen is suitably charged as such or it is diluted with an inert gas such as nitrogen or argon. One oxygen-containing gas suitably employed is air. Particularly preferred for use in the reaction is molecular oxygen without additional inert gas diluents.

At the conclusion of the reaction the product mixture is separated and the olefin oxide product is recovered by conventional means such as fractional distillation, selective extraction and the like. Unreacted olefin, solvent and catalyst are suitably recycled for further use.

The olefin oxide products are materials of established utility and many are chemicals of commerce. For example, illustrative olefin oxides which are readily prepared by the process of the invention such as propylene oxide, 1,2 - epoxybutane, 1,2 - epoxydodecane and 1,2-epoxyhexadecane are formulated into useful polymers by polymerization or copolymerization as disclosed by U.S. Patents 2,815,343, 2,871,219, and 2,987,489. Propylene oxide is currently prepared on a large commercial scale by the classic chlorohydrin process.

To further illustrate the improved process of the invention, the following examples are provided. It should be understood that the details thereof are not to be regarded as limitations as they may be varied as will be understood by one skilled in this art.

EXAMPLE I

A mixture of 0.25 g. cobalt di-(salicylal)-ethylenediimine, 50 ml. of n-octene-1, a small amount of t-butyl hydroperoxide and 50 ml. of acetonitrile was placed in an oxidation apparatus consisting of a reactor immersed in a constant temperature bath and fitted with a condenser and a circulation pump. Oxygen was introduced at 35 p.s.i.g. and circulated through the mixture which was maintained at 85° C. Samples were periodically withdrawn and analyzed by gas-liquid chromatography. The cobalt catalyst remained brown in color throughout the course of the reaction. No cobalt formate was formed. The reaction progressed as shown by the following analyses.

| Conversion of octene-1, percent | Selectivity to 1-2-epoxyoctane, percent | Color of reaction mixture |
| --- | --- | --- |
| 5.2 | 73.4 | Brown. |
| 8.4 | 66.4 | Do. |
| 9.5 | 62.7 | Do. |
| 43.9 | 48 | Do. |
| 50 | 57 | Do. |

The behavior of the cobalt di-(salicylal)-ethylenediimine catalyst was found to be in sharp contrast to that of the prior art recognized cobalt oxidation catalyst, cobalt octoate. For example, in the oxidation of octene-1 with cobalt octoate by a procedure similar to that described above, the green colored oxidation mixture was observed to gradually fade and change into a pink mixture with gradual precipitation of pink cobalt formate and concomitant decrease in selectivity to epoxide product. The course of the reaction is shown by the following analyses.

| Conversion of octene-1, percent | Selectivity to 1,2-epoxyoctane, percent | Color of reaction mixture |
|---|---|---|
| 5 | 10.5 | Green. |
| 7 | 24 | Do. |
| 10 | 37 | Do. |
| 17.5 | 43 | Light green. |
| 22.5 | 42 | Do. |
| 40 | 40 | Pink, gradual precipitation of Co formate. |
| 62 | 29 | Pink, large amounts precipitated of Co formate. |

When cobalt acetylacetonate was used as catalyst, a similar decline in selectivity to epoxide product and decrease in catalytic activity was observed as cobalt formate began to precipitate.

EXAMPLE II

By a procedure similar to that of Example I, cobalt di-(3 - nitrosalicylal) - ethylenediimine, cobalt di-(5-nitrosalicylal) - ethylenediimine, cobalt di-(salicylal)-methylethylenediimine and cobalt di-(salicylal)-phenylenediimine were independently used as catalyst in the oxidation of octene-1. These catalysts were found to be active oxidation catalysts and gave selectivities to 1,2-epoxyoctane which were comparable to that of cobalt di-(salicylal) ethylenediimine.

EXAMPLE III

By a procedure similar to that of Example I, good yields of 1,2-epoxyoctane and propylene oxide are obtained by the use of cobalt di-(3,5-dichlorosalicylal)-ethylenediimine, cobalt di-(3-chlorosalicylal)-ethylenediimine, cobalt di-(3-bromosalicylal)-ethylenediimine, and cobalt di-(3-fluorosalicylal)-ethylenediimine as catalyst in the oxidation of octene-1 and propylene.

EXAMPLE IV

By a procedure similar to that of Example I, a good yield of propylene oxide is obtained by the use of cobalt di-(salicylal)-ethylenediimine as catalyst in the oxidation of propylene with oxygen.

I claim as my invention:
1. A process of preparing an olefin oxide by contacting a normal acyclic terminal monoolefin of from 3 to 20 carbon atoms in liquid phase at from 50° to about 250° C. with molecular oxygen in solution in the presence of a catalytic amount of a cobalt di-(salicylal)-diimine represented by the formulas

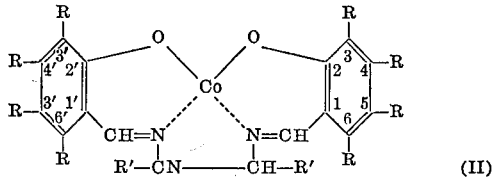

(II)

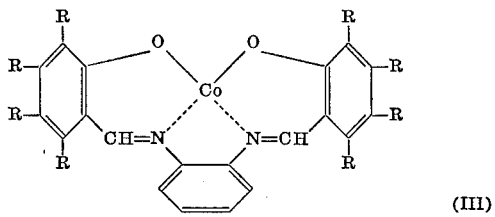

(III)

wherein R' independently is hydrogen or alkyl of up to 4 carbon atoms and R independently is hydrogen, nitro, hydroxy, alkyl of up to 6 carbon atoms and halogen of atomic number 9 to 35 inclusive.

2. The process of claim 1 wherein the monoolefin has from 3 to 12 carbon atoms.
3. The process of claim 2 wherein the cobalt diimine chelate is cobalt di-(salicylal)-phenylenediimine.
4. The process of claim 2 wherein the cobalt diimine chelate is represented by Formula II.
5. The process of claim 4 wherein the cobalt diimine chelate is cobalt di-(salicylal)-ethylenediimine.
6. The process of claim 4 wherein the cobalt diimine chelate is cobalt di-(3-fluorosalicylal)-ethylenedimine.
7. The process of claim 4 wherein the cobalt diimine chelate is cobalt di-(salicylal)-methylethylenediimine.
8. The process of claim 4 wherein the cobalt diimine chelate is cobalt di-(salicylal)-1,2-dimethylethylenediimine.
9. The process of claim 2 wherein the monoolefin is n-octene-1.
10. The process of claim 2 wherein the monoolefin is propylene

References Cited
UNITED STATES PATENTS
| | | | |
|---|---|---|---|
| 2,769,017 | 10/1956 | Reppe et al. | 260—348.5 |
| 2,780,635 | 2/1957 | Gardner et al. | 260—348.5 |
| 3,007,944 | 11/1961 | Amir | 260—348.5 |
| 3,071,601 | 1/1963 | Aries | 260—348.5 |
| 3,210,380 | 10/1965 | Sharp et al. | 260—348.5 |

NORMA S. MILESTONE, Primary Examiner

U.S. Cl. X.R.

260—439